United States Patent
Miyoshi et al.

(10) Patent No.: US 12,024,068 B2
(45) Date of Patent: Jul. 2, 2024

(54) MODE ADJUSTMENT SYSTEM AND MODE ADJUSTMENT METHOD

(71) Applicant: TS TECH CO., LTD., Saitama (JP)

(72) Inventors: Takako Miyoshi, Tochigi (JP); Takayuki Kobori, Tochigi (JP); Akio Seya, Tochigi (JP); Hiroki Shibayama, Tochigi (JP); Kazuyoshi Iizuka, Tochigi (JP); Ai Furuta, Tochigi (JP); Kazuaki Mima, Tochigi (JP); Yuichiro Hoshi, Tochigi (JP); Tomohisa Chiba, Tochigi (JP); Kensuke Mori, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 112 days.

(21) Appl. No.: 17/911,956

(22) PCT Filed: Mar. 16, 2021

(86) PCT No.: PCT/JP2021/010680
§ 371 (c)(1),
(2) Date: Sep. 15, 2022

(87) PCT Pub. No.: WO2021/187495
PCT Pub. Date: Sep. 23, 2021

(65) Prior Publication Data
US 2023/0173953 A1 Jun. 8, 2023

Related U.S. Application Data

(60) Provisional application No. 62/990,651, filed on Mar. 17, 2020.

(51) Int. Cl.
*B60N 2/02* (2006.01)
*B60J 1/20* (2006.01)

(52) U.S. Cl.
CPC .......... *B60N 2/0244* (2013.01); *B60J 1/2011* (2013.01)

(58) Field of Classification Search
CPC ........................... B60N 2/0244; B60J 1/2011
See application file for complete search history.

(56) References Cited

U.S. PATENT DOCUMENTS 10,493,995 B2 * 12/2019 Chen .................... B60H 1/2226
10,850,693 B1 * 12/2020 Pertsel ................. G06V 20/597
(Continued)

FOREIGN PATENT DOCUMENTS

| JP | 2002-166379 A | 6/2002 |
| JP | 2009-149262 A | 7/2009 |

(Continued)

OTHER PUBLICATIONS

International Search Report mailed on Jun. 1, 2021, for corresponding PCT Application No. PCT/JP2021/010680, with English translation.

*Primary Examiner* — Philip F Gabler
(74) *Attorney, Agent, or Firm* — Michael Best & Friedrich LLP

(57) ABSTRACT

A mode adjustment system capable of changing interior in a conveyance with less effort and time includes an input device that allows an occupant to select mode information in which position information of a seat and a shade are registered in advance, a mode switching device that receives the mode information from the input device and switches the positions of the seat and the shade based on the mode information, a seat adjustment device, and a shade adjustment device. The mode switching device includes a seat movement amount calculator calculating the movement amount of the seat and a shade movement amount calculator calculating the movement amount of the shade, the seat adjustment device adjusts the position of the seat based on (Continued)

the calculated movement amount of the seat, and the shade adjustment device adjusts the position of the shade based on the calculated movement amount of the shade.

13 Claims, 20 Drawing Sheets

(56) References Cited

U.S. PATENT DOCUMENTS

| | | | | |
|---|---|---|---|---|
| 2011/0031772 | A1* | 2/2011 | Mabuchi | B60N 2/01 |
| | | | | 296/64 |
| 2019/0283629 | A1* | 9/2019 | Kobayashi | B60N 2/0244 |
| 2020/0231040 | A1* | 7/2020 | Hwang | B60R 11/0235 |
| 2020/0331327 | A1* | 10/2020 | Nishio | B60J 3/02 |
| 2021/0212221 | A1* | 7/2021 | Diboine | H05K 5/0217 |
| 2022/0144168 | A1* | 5/2022 | Ito | A47C 7/62 |

FOREIGN PATENT DOCUMENTS

| | | |
|---|---|---|
| JP | 2010-023635 A | 2/2010 |
| JP | 2010-068941 A | 4/2010 |
| JP | 2017-172246 A | 9/2017 |
| JP | 2019-007271 A | 1/2019 |
| JP | 2019-119347 A | 7/2019 |

* cited by examiner

MODE ADJUSTMENT SYSTEM AND MODE ADJUSTMENT METHOD

CROSS-REFERENCE TO RELATED APPLICATIONS

This application is a National Entry application of PCT Application Serial Number PCT/JP2021/010680, filed Mar. 16, 2021. Further, this application claims priority from U.S. Provisional Patent Application Ser. No. U.S. 62/990,651, filed Mar. 17, 2020, the entire contents of which are hereby incorporated by reference into this application.

TECHNICAL FIELD

The present invention relates to a mode adjustment system and a mode adjustment method in a conveyance interior and particularly to a mode adjustment system and a mode adjustment method of adjusting a state of an interior part of a conveyance interior.

BACKGROUND ART

Conventionally, there have been proposed devices that promote communication between occupants and create personal spaces by arranging the arrangement of seats in a vehicle interior (for example, PATENT LITERATURE 1). Further, there have been also disclosed that a sunshade for a door is provided on the door of the vehicle in order to block the light outside the vehicle (for example, PATENT LITERATURE 2).

CITATION LIST

Patent Literature

PATENT LITERATURE 1: JP 2009-149262 A
PATENT LITERATURE 2: JP 2019-7271 A

SUMMARY OF INVENTION

Technical Problem

On the other hand, there is an increasing demand not only for moving with respect to an automobile but also for enhancing a vehicle interior as a private space with the expansion of automatic driving and the spread of shared cars. When realizing a private space to spend time in the vehicle interior, a part of a window is shielded or a seat is accommodated or a height thereof is adjusted. However, since there are many interior parts (seats, shades, and the like) to be operated, it took effort and time for the occupants to change the arrangement of the interior parts.

The present invention has been made in view of the above-described problems and an object thereof is to provide a mode adjustment system and a mode adjustment method for a conveyance interior realizing a change in arrangement of interior parts in a conveyance interior with less effort and time.

Solution to Problem

The above-described object is solved by a mode adjustment system for adjusting positions of a seat and a shade provided in an interior of a conveyance, including: an input device that is configured so that an occupant selects one of a plurality of mode information in which position information of the seat and the shade are registered in advance; a mode switching device that receives the mode information selected by the occupant from the input device and switches the positions of the seat and the shade on the basis of the received mode information; a seat adjustment device that adjusts the position of the seat; and a shade adjustment device that adjusts the position of the shade, wherein the mode switching device includes: a storage unit that stores the plurality of mode information, an input unit that receives the mode information selected from the input device, a seat position detection unit that detects a current position of the seat, a seat movement amount calculation unit that calculates a movement amount of the seat from position information of the seat registered in the mode information and a current position of the seat detected by the seat position detection unit, a shade position detection unit that detects a current position of the shade, a shade movement amount calculation unit that calculates a movement amount of the shade from position information of the shade registered in the mode information and a current position detected by the shade position detection unit, and a transmission unit that transmits the calculated movement amount of the seat to the seat adjustment device and transmits the calculated movement amount of the shade to the shade adjustment device, wherein the seat adjustment device adjusts the position of the seat on the basis of the received movement amount of the seat, and wherein the shade adjustment device adjusts the position of the shade on the basis of the received movement amount of the shade.

Further, the above-described object is solved by a mode adjustment method of adjusting positions of a seat and a shade by using an input device configured to select one of a plurality of mode information in which position information of the seat and the shade provided in an interior of a conveyance are registered, a mode switching device switching the positions of the seat and the shade on the basis of the mode information, a seat adjustment device adjusting the position of the seat, and a shade adjustment device adjusting the position of the shade, including: causing the mode switching device to store the plurality of mode information; causing the mode switching device to receive the mode information selected by the input device; causing the mode switching device to detect a current position of the seat; causing the mode switching device to detect a current position of the shade; causing the mode switching device to calculate a movement amount of the seat from position information of the seat included in the mode information received from the input device and the detected current position of the seat; causing the mode switching device to calculate a movement amount of the shade from position information of the shade included in the mode information received from the input device and the detected current position of the shade; causing the mode switching device to transmit the calculated movement amount of the seat to the seat adjustment device; causing the mode switching device to transmit the calculated movement amount of the shade to the shade adjustment device; causing the seat adjustment device to adjust the position of the seat on the basis of the received movement amount of the seat; and causing the shade adjustment device to adjust the position of the shade on the basis of the received movement amount of the shade.

According to the mode switching device or the mode adjustment method of the present invention, a change in arrangement of interior parts in a conveyance interior can be realized with less effort and time by switching the positions of the seat and the shade on the basis of the mode information input by the occupant.

Further, the mode adjustment system for the conveyance interior may further include: a door lock device that locks a door of the conveyance, the mode switching device may include a door lock detection unit that detects a locked state of the door, the mode switching device may detect the locked state of the door by the door lock detection unit before the positions of the seat and the shade are adjusted, and the mode switching device may lock the door by the door lock device when the door is not locked.

By operating the mode switching device after detecting the door lock, the mode can be safely switched.

Further, in the mode adjustment system for the conveyance interior, the mode switching device may switch the positions of the seat and the shade when the conveyance is in a stop state or an automatic driving state.

By operating the mode switching device in a stop state or an automatic driving state of the conveyance, the mode can be safely switched.

Further, the mode adjustment system for the conveyance interior may further include: a biological information detection device that detects biological information of the occupant; and a notification device that notifies the occupant of an alarm, and when the biological information detection device detects a change in the biological information of the occupant, the mode switching device may instruct the shade adjustment device to move the shade to a predetermined position and instruct the notification device to notify the alarm.

By detecting the biological information of the occupant, changing the position of the shade, and notifying an alarm by the notification device, a change in the biological information can be reliably transmitted to the occupant.

Further, the mode adjustment system for the conveyance interior may further include: a movable member that is provided in a door of the conveyance to be movable on the door; and a movable member adjustment device that adjusts a position of the movable member, and the mode switching device may include an occupant position detection unit that detects a current position of the occupant and instructs the movable member adjustment device to adjust the position of the movable member on the basis of the current position of the occupant detected by the occupant position detection unit.

By adjusting the position of the movable member on the basis of the current position of the occupant, interior parts can be appropriately arranged with less effort and time.

Further, the mode adjustment system for the conveyance interior may further include: a movable member that is provided in a door of the conveyance to be movable on the door; and a movable member adjustment device that adjusts a position of the movable member, and the mode switching device may instruct the movable member adjustment device to adjust the position of the movable member on the basis of a current position of the seat detected by the seat position detection unit.

By adjusting the movable member on the basis of the current position of the seat, interior parts can be appropriately arranged with less effort and time.

Further, the mode adjustment system for the conveyance interior may further include: a movable member that is provided in a door of the conveyance to be movable on the door, and the mode switching device may include a movable member position detection unit that detects a current position of the movable member and instructs the seat adjustment device to adjust the position of the seat on the basis of the current position of the movable member detected by the movable member position detection unit.

By adjusting the position of the seat on the basis of the current position of the movable member, interior parts can be appropriately arranged with less effort and time.

Further, in the mode adjustment system for the conveyance interior, the movable member may be provided to be movable on a door trim provided on an interior side of the door.

Since the movable member (for example, the lamp device/speaker) is provided to be movable on the door trim, the movable member can be disposed at a more appropriate position.

Further, in the mode adjustment system for the conveyance interior, the mode switching device may include a window position detection unit that detects a current position of a window provided in the conveyance and switches the positions of the seat and the shade when a current position of the window detected by the window position detection unit is located at a closed position.

By switching the mode with the window closed, for example, the influence of wind or the like from the outside can be minimized, and the positions of the seat and the shade can be switched more safely.

Further, the mode adjustment system for the conveyance interior may further include: a window adjustment device that adjusts a position of a window provided in the conveyance, and the mode switching device may include a window position detection unit that detects a current position of the window and instructs the window adjustment device to move the window to the position of the shade when a current position of the window detected by the window position detection unit is located at an open position.

Since the fluttering of the shade is suppressed by moving the window to the position of the shade, the shade can be protected.

Further, in the mode adjustment system for the conveyance interior, the mode switching device may include a window position detection unit that detects the current position of the window provided in the conveyance, and the mode switching device may instruct the shade adjustment device to adjust the position of the shade on the basis of the current position of the window.

Since the fluttering of the shade is suppressed by moving the shade to the position of the window, the shade can be protected.

Further, in the mode adjustment system for the conveyance interior may further include: a window adjustment device that adjusts a position of a window provided in the conveyance, and the mode switching device may instruct the window adjustment device to adjust the position of the window on the basis of the current position of the shade.

Since the fluttering of the shade is suppressed by moving the window to the position of the shade, the shade can be protected.

Advantageous Effects of Invention

According to the mode switching device or the mode adjustment method of the present invention, a change in arrangement of interior parts in a conveyance interior can be realized with less effort and time by switching the positions of the seat and the shade on the basis of the mode information input by the occupant.

By operating the mode switching device after detecting the door lock, the mode can be safely switched.

By operating the mode switching device in a stop state or an automatic driving state of the conveyance, the mode can be safely switched.

By detecting the biological information of the occupant, changing the position of the shade, and notifying an alarm by the notification device, a change in the biological information can be reliably transmitted to the occupant.

By adjusting the position of the movable member (for example, the lamp device and the speaker) on the basis of the current position of the occupant, interior parts can be appropriately arranged with less effort and time.

Further, by adjusting the position of the movable member on the basis of the current position of the seat, interior parts can be appropriately arranged with less effort and time.

By adjusting the position of the seat on the basis of the current position of the movable member, interior parts can be appropriately arranged with less effort and time.

Since the movable member is provided to be movable on the door trim, the movable member can be disposed at a more appropriate position.

Further, by switching the mode with the window closed, for example, the influence of wind or the like from the outside can be minimized, and the positions of the seat and the shade can be switched more safely.

Further, since the fluttering of the shade is suppressed by moving the window to the position of the shade, the shade can be protected.

Further, since the fluttering of the shade is suppressed by moving the shade to the position of the window, the shade can be protected.

Since the fluttering of the shade is suppressed by moving the window to the position of the shade, the shade can be protected.

DESCRIPTION OF EMBODIMENTS

Hereinafter, a configuration of a mode adjustment system 1 according to a first embodiment of the present invention will be described with reference to the drawings. However, the embodiments described below are for facilitating the understanding of the present invention and do not limit the present invention. That is, the present invention can be modified and improved without departing from the gist thereof, and it goes without saying that the present invention includes an equivalent thereof.

Additionally, hereinafter, a mode adjustment system 1 that adjusts and changes the positions of a seat S, a shade SH, and the like provided in a conveyance vehicle (vehicle V) such as a minivan to switch modes will be given as an example of the mode adjustment system 1 and a configuration example thereof will be described.

Further, in the following description, the "front to back direction" is the front to back direction of the vehicle V, which is the direction that coincides with the traveling direction when the vehicle is running. Further, the "width direction" is the width direction of the vehicle V, which is the direction that coincides with the right and left direction seen from the occupant seated on the seat S. Further, the "up and down direction" is the up and down direction of the vehicle V, which is the direction that coincides with the vertical direction when the vehicle V is running on a horizontal plane. Further, the term "outside" means the one closer to the outside in the direction from the center of the vehicle to the outside, and the term "inside" means the one closer to the center in the direction from the outside to the center of the vehicle V. Further, the "interior side" means the direction toward the vehicle interior.

<Seat>

Figure 1:
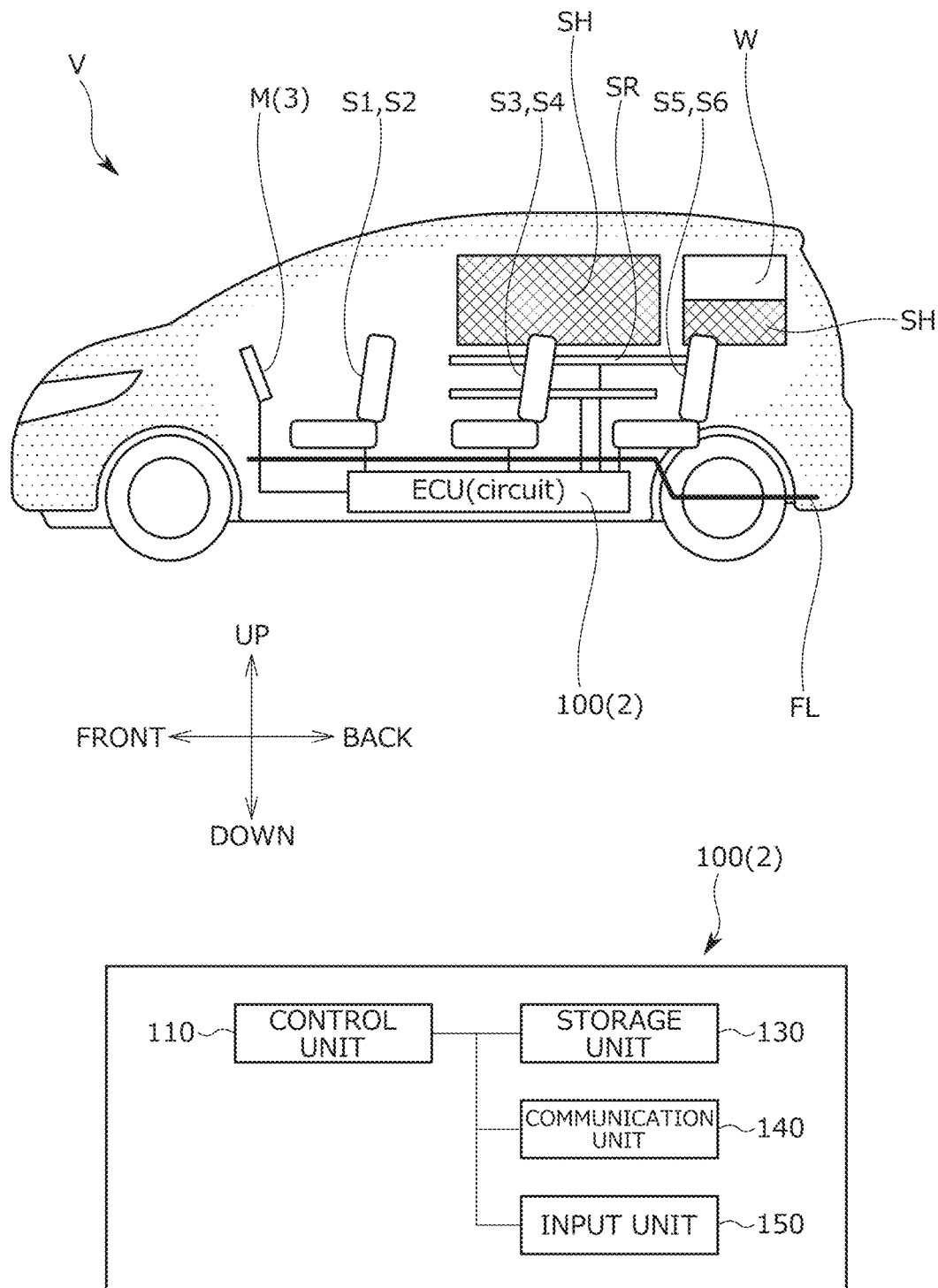
FIG. 1 is an explanatory diagram explaining a vehicle equipped with a mode adjustment system of an embodiment.
Figure 2:
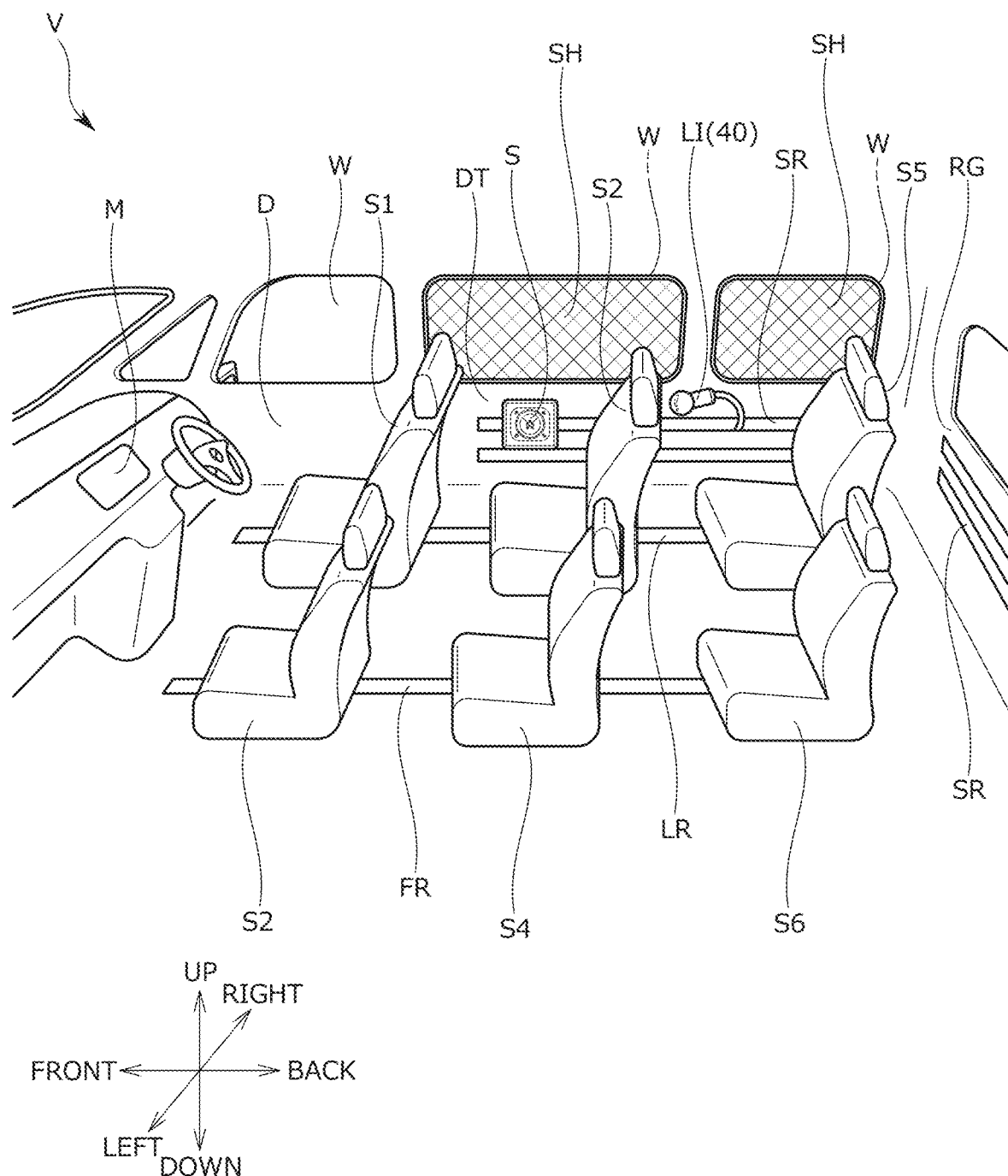
FIG. 2 is an explanatory diagram explaining an interior of the vehicle equipped with the mode adjustment system.

FIGS. 1 and 2 show the side surface of the vehicle V including the mode adjustment system 1 according to an embodiment of the present invention and the interior of the vehicle V. As shown in FIGS. 1 and 2, a driver seat S1 and an assistant seat S2, MID seats S3 and S4 provided in a second row, and 3rd seats S5 and S6 provided in a third row are arranged in the interior of the vehicle V in order from the front to the back of the vehicle V. In the following description, when the driver seat S1, the assistant seat S2, the MID seats S3 and S4, and the 3rd seats S5 and S6 are not particularly distinguished from each other, they may be collectively referred as the seat S.

Each of the seats S mounted on the vehicle V is connected to a seat adjustment device 4 which supports the seat to be slidable in the front to back direction of the vehicle V with respect to a floor FL of the vehicle interior. The seat adjustment device 4 may have a rotation function of rotating each seat S in the horizontal direction. The seat adjustment device 4 includes a long rail LR which is provided on the floor FL and a plurality of drive mechanisms (not shown) which are provided on the seat S or under the floor in order to realize the slide function and the rotation function.

The drive mechanism for driving the seat S is provided in a motor (not shown) and the motor has a function of transmitting a signal in response to the rotation. The motor of the seat adjustment device 4 is connected to an ECU 100 (the mode switching device 2 to be described later) and the ECU 100 can measure the current position of the seat S by receiving and counting a signal from the motor.

Additionally, a method of measuring the current position of the seat S by using a signal from the motor is an example and the position of the seat S may be measured by using a sensor such as an infrared sensor or a LiDAR sensor.

<Door>

A door D of the vehicle V is provided with a door lock device 6 which locks the door D or releases the lock. The door lock device 6 is connected to the ECU 100 and can be controlled by the ECU 100, so that the locked state of the door D can be grasped and the door D can be locked or unlocked.

<Window>

The window W provided in the door D is attached to a window opening to be openable and closable and can be opened and closed by a window adjustment device 7 including a drive mechanism (not shown) provided in the door D. By measuring a signal from the motor provided in the drive mechanism in the same way as the seat adjustment device 4 of the seat S, it is possible to grasp the current position of the window W and determine whether or not the window W is closed.

<Shade>

Further, as shown in FIGS. 1 to 3A, the shade SH for blocking sunlamp incident from the window opening is provided inside the window W. The shade SH is attached to cover the window opening.

The shade SH can also be opened and closed by a shade adjustment device 5 including a drive mechanism (not shown) provided in the door D similarly to the window W. By measuring a signal from a motor (not shown) provided in the drive mechanism, it is possible to determine whether the shade SH is a state of covering and closing the window W or to grasp the current position of the shade SH (the position of the upper end of the shade SH).

Figure 3A:
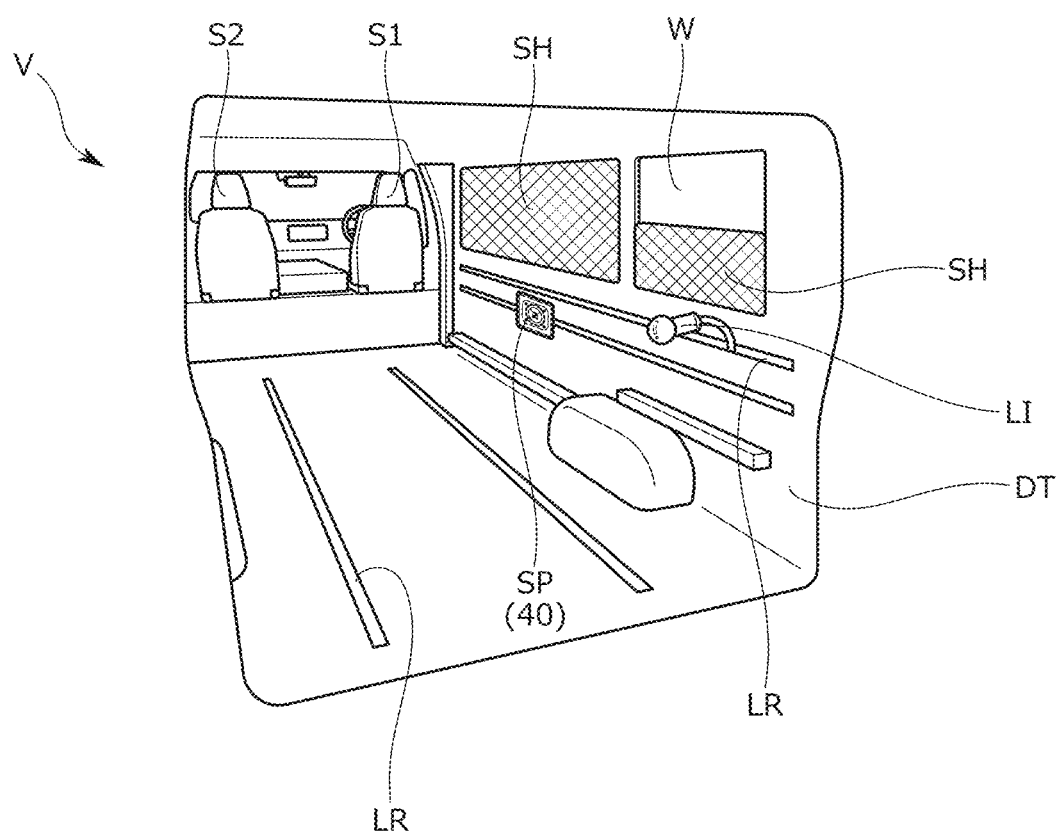
FIG. 3A is an explanatory diagram showing a shade mounted on the vehicle.
Figure 3B:
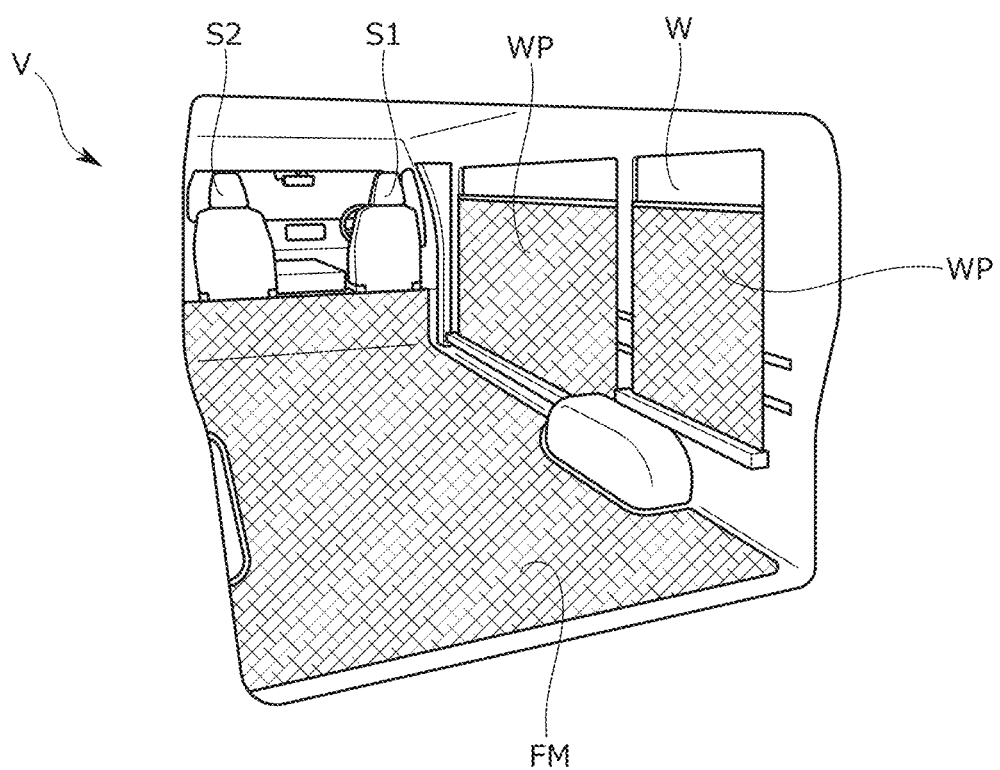
FIG. 3B is an explanatory diagram showing a floor mat and a wallpaper mounted on the vehicle.

Additionally, the shade SH used in this embodiment is provided inside the window W, but this is an example. The shade SH may be a sunshade provided on the sunroof of the vehicle ceiling. Further, as shown in FIG. 3B, a roll-up wallpaper WP provided in the interior may be used as the shade SH. By winding up the wallpaper WP, it is possible to block sunlamp or the line of sight from the outside.

<Movable Member>

A movable member 40 is movably attached to the door D of this embodiment, particularly, a door trim DT disposed below the window W. The movable member 40 is, for example, a lamp LI, a speaker SP, a hot/cold cup holder CH, or a table TB. As shown in FIGS. 1 to 3A, two slide rails SR which extend in the front to back direction of the vehicle are provided in the door trim DT of the door D. Sliding parts provided to be slidable on the rail are attached to the slide rail SR. By attaching the movable member 40 to the sliding part, it is possible to change the position of the movable member 40. Additionally, the slide rail SR may be provided in a rear gate RG as shown in FIG. 2.

Further, the slide rail SR and the sliding part that slide are connected by a wireless power supply device and the movable member 40 such as the lamp LI and the speaker SP attached to the sliding part can obtain electric power from the slide rail SR.

Further, a movable member adjustment device 8 which moves the sliding part along the slide rail SR is provided. The movable member adjustment device 8 includes a drive mechanism (not shown) having a motor and the ECU 100 can grasp the current position of the movable member 40 attached to the sliding part by receiving and measuring a signal from the motor.

<Biological Information Detection Device>

The vehicle V is provided with a biological information detection device 9 which detects the biological information of the occupant. The biological information detection device 9 is, for example, a temperature sensor or a pressure sensor provided on a seat surface of the seat S and can measure the body temperature of the occupant or the timing of breathing of the occupant with the pressure sensor. The measured biological information is transmitted to the ECU 100.

<Input Device>

The vehicle V is provided with a monitor M which is provided on the front side of the interior and can receive a touch input. The monitor M can display information by the ECU 100 and receive an input of mode information or the like when the occupant touches a screen. In this embodiment, the monitor functions as an input device 3. Additionally, the input device 3 may be a mobile terminal such as a smartphone owned by the occupant. The mobile terminal can be connected to the ECU 100 by short-range wireless communication such as BlueTooth (registered trademark) or WiFi, and information can be input to the ECU 100.

<ECU>

The ECU 100 includes a control unit 110, a storage unit 130, an input unit 150, and a transmission unit 140 as hardware. The control unit 110 is a device (for example, CPU: Central Processing Unit) for executing an instruction set described in a program. The control unit 110 executes various arithmetic processes on the basis of the programs and data stored in the storage unit 130 and controls each device of the mode adjustment system 1 connected to the ECU 100.

The storage unit 130 includes, for example, a memory and a magnetic disk device, and stores various programs and data. The storage unit 130 stores a plurality of mode information including position information of the seat S, the shade SH, the movable member 40, and the like. A work memory of a processor is also used as the storage unit 130. The storage unit 130 may include an information storage medium such as a flash memory or an optical disk. Additionally, the mode information stored in the storage unit 130 may be read from an information storage medium (CD-ROM, SD card, USB memory, or the like) that can be read by a computer or may be received via a communication line such as an Internet or an intranet.

The transmission unit 140 of the ECU 100 is a part that outputs a signal to each device and in the case of this embodiment, the transmission unit is connected to the speaker SP and the lamp LI provided as the movable member 40 and outputs a signal for notifying the occupant of an alarm. Further, the information of the movement amount of the seat S and the shade SH is transmitted to the seat adjustment device 4 and the shade adjustment device 5.

In this embodiment, the input unit 150 of the ECU 100 is connected to the monitor M with a touch panel provided on a dashboard or the like, and receives input information. The input unit 150 may receive information from an input device such as a keyboard or a mouse. The input unit also receives the biological information of the occupant measured from the biological information detection device 9. Further, as described above, the input unit may also receive information from a mobile terminal connected by BlueTooth (registered trademark) or the like.

Figure 4:
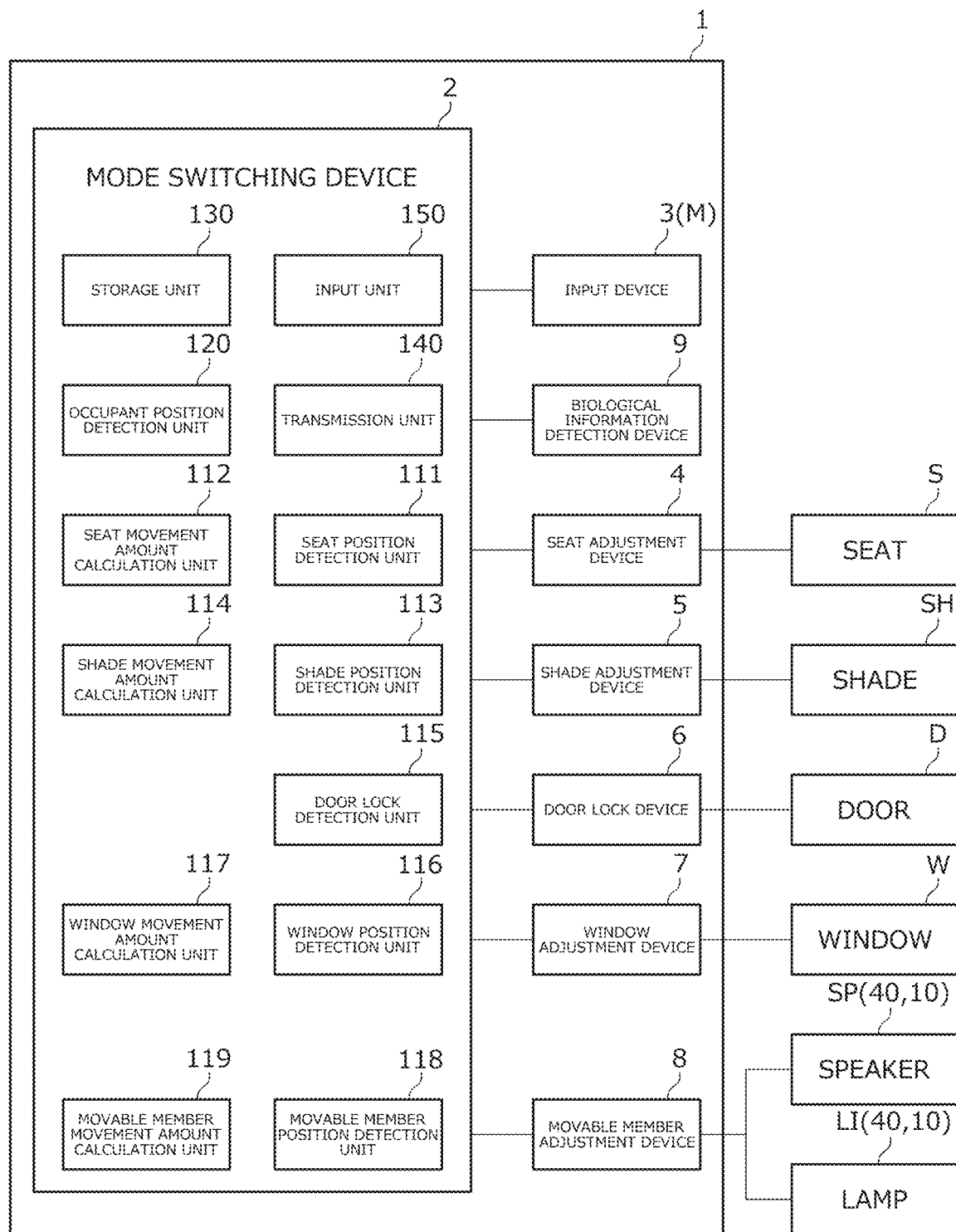
FIG. 4 is a functional block diagram showing a function of the mode adjustment system.

FIG. 4 shows a control target of the ECU 100 mounted on the vehicle V. As described above, the vehicle V includes the seat S, the shade SH, the door D, the window W, and the movable member 40 which corresponds to the speaker SP and the lamp LI. The seat adjustment device 4 which moves the seat S is connected to the seat S. The shade adjustment device 5 which moves the shade SH is connected to the shade SH. The door lock device 6 which detects the locked state of the door D or locks the door D is connected to the door D. The window adjustment device 7 which opens and closes the window W is connected to the window W. Further, the biological information detection device 9 which detects the biological information of the occupant is mounted on the seat S.

The movable member 40 is provided with the movable member adjustment device 8 which slides the movable member 40 along the slide rail SR.

<Mode Information>

The mode information is information registered in advance in the storage unit 130 by the occupant according to the purpose, and includes position information of the seat S and the shade SH corresponding to the mode. For example, in the case of the mode for the purpose of rest, the position information of the shade SH that covers the window W in order to darken the interior is registered together with the position information of the seat S and the information of the state of tilting backward and reclining.

Further, in the mode of seeing the outside scenery, the position information when the shade SH is lowered so that the outside scenery can be seen from the window W with the seat S in the seated state is registered.

In this way, it is possible to set the mode to decrease the sense of distance between the occupants seated on each seat S and promote communication between the occupants by moving the seat S in the front to back direction, changing the position of the seat, or changing the direction of the seat S.

Further, it is also possible to set a personal space, for example, a relaxing mode for resting or a mode for enjoying the outside scenery by increasing the distance of the seat S for the vehicle.

A plurality of such mode information is registered in the storage unit 130, and the occupant selects the mode information using the input device 3 such as the monitor M or the mobile terminal. The ECU 100 (the mode switching device 2) of the mode adjustment system 1 changes the positions or states of the seat S, the shade SH, and the movable member 40 by controlling the seat adjustment device 4, the shade adjustment device 5, and the movable member adjustment device 8 on the basis of the input mode information.

In this way, it will produce a better space and improve the comfort of the interior environment by registering the mode information in consideration of the relationship with adjacent seats and changing the position of the seat S or the like on the basis of the mode information.

<Function of Mode Adjustment System>

Hereinafter, the mode adjustment system 1 for adjusting the positions of the seat S, the shade SH, and the like provided in the interior of the vehicle V will be described. The mode adjustment system 1 includes at least the input device 3, the mode switching device 2 which switches the positions of the seat S and the shade SH, the seat adjustment device 4 which adjusts the position of the seat S, and the shade adjustment device 5 which adjusts the position of the shade SH.

The input device 3 is realized by the monitor M with a touch panel provided on the dashboard in the interior as described above.

The mode switching device 2 is realized by the control unit 110, the storage unit 130, and the like of the ECU 100 mounted on the vehicle V and controls each connected device. The seat adjustment device 4 is realized by the drive mechanism for sliding the seat S in the front to back direction. The shade adjustment device 5 is realized by a driving device used for raising and lowering the shade.

In this embodiment, the mode adjustment system 1 includes the door lock device 6 which locks the door D of the vehicle V.

The mode switching device 2 is connected to the door lock device 6 and can confirm the locked state of the door D on the basis of the signal transmitted from the door lock device 6. Further, it is possible to lock the door D by controlling the door lock device 6.

The mode adjustment system 1 includes the window adjustment device 7 that adjusts and opens or closes the position of the window W of the vehicle V. The window adjustment device 7 is realized by a driving device used for raising and lowering the window by changing the position of the window W. The window adjustment device 7 is connected to the mode switching device 2 and the mode switching device 2 can raise and lower the window by controlling the window adjustment device 7.

Further, the mode adjustment system 1 includes the movable member adjustment device 8 which adjusts the position of the movable member 40. The movable member adjustment device 8 is realized by a drive mechanism (not shown) for sliding the movable member 40 along the door trim. The movable member adjustment device 8 is connected to the mode switching device 2 and can be controlled by the mode switching device. For example, the position of the seat S can be adjusted by the selected mode information and then can be disposed at an appropriate position of the movable member 40.

The mode adjustment system 1 further includes the biological information detection device 9 which detects the biological information of the occupant. In this embodiment, the biological information detection device 9 is realized by a pressure sensor and/or a temperature sensor provided in the seat S. The pressure sensor can be used to acquire the breathing state of the occupant, and the temperature sensor can be used to measure the body temperature of the occupant.

The mode adjustment system 1 includes a notification device 10 that notifies an occupant of an alarm. The notification device 10 is realized by the speaker SP and/or the lamp LI provided in the door trim as the movable member 40. The notification device 10 is connected to the mode switching device 2, and the mode switching device 2 can transmit a signal indicating an alarm by the transmission unit 140 and can notify the occupant of the alarm by the notification device 10 as needed.

<Mode Switching Device>

The mode switching device 2 includes the storage unit 130, the input unit 150, a seat position detection unit 111, a seat movement amount calculation unit 112, a shade position detection unit 113, a shade movement amount calculation unit 114, and the transmission unit 140.

The storage unit 130 stores a plurality of mode information in which the position information of the seat S and the shade SH are stored. The input unit 150 receives the mode information selected by the occupant from the input device 3. The seat position detection unit 111, the seat movement amount calculation unit 112, the shade position detection unit 113, and the shade movement amount calculation unit 114 are executed as a program by the control unit 110.

The seat position detection unit 111 detects the current position of the seat S on the basis of the signal received from the seat adjustment device 4. The seat movement amount calculation unit 112 calculates the movement amount of the seat S to the position stored in the position information from the information of the position of the seat S stored in the mode information and the current position of the seat S detected by the seat position detection unit 111. The transmission unit 140 transmits the movement amount calculated for each device. The mode switching device 2 transmits the calculated movement amount to the seat adjustment device 4 via the transmission unit 140. The seat adjustment device 4 moves the seat S by driving the motor of the drive mechanism on the basis of the received movement amount and adjusts its position. At this time, the back seat of the seat S may be tilted and reclined on the basis of the seat state information stored in the mode information. This state information is transmitted from the mode switching device 2 together with the information of the movement amount.

The shade position detection unit 113 detects the current position of the shade SH on the basis of the signal received from the shade adjustment device 5. The shade movement amount calculation unit 114 calculates the movement amount of the shade SH from the current position to the position stored in the position information on the basis of the information of the position of the shade SH stored in the mode information and the current position of the shade SH detected by the shade position detection unit 113. The mode switching device 2 transmits the calculated movement amount of the shade SH to the shade adjustment device 5 via the transmission unit 140. The shade adjustment device 5 moves the shade SH up and down by driving the motor of the drive mechanism on the basis of the received movement amount of the shade SH and adjusts its position.

The door lock detection unit 115 detects the locked state of the door D on the basis of the signal received from the door lock device 6. The mode switching device 2 does not switch the seat S and the shade SH when it is determined that the door D is not locked on the basis of the received signal. When the door D is closed and can be locked, the door lock device 6 is instructed to lock the door D, and more specifically, a lock signal is transmitted to the door lock device 6. When the door lock device 6 receives the lock signal from the mode switching device 2, the door lock device 6 locks the door D. Then, the mode switching device 2 switches the mode.

Here, a mode switching process by the mode switching device 2 will be described with reference to FIGS. 5 to 7.

The input device 3 displays a plurality of modes (for example, a list of normal mode, relaxing mode, and the like) stored in the storage unit 130, and allows the occupant to select the mode. The input device 3 transmits the mode information corresponding to the selected mode to the mode switching device 2 (step S101).

Next, the mode switching device 2 confirms whether or not the door D is locked (door lock confirmation process: step S102). The door lock confirmation process will be described later.

Additionally, the mode switching device 2 detects not only when the door D is locked but also whether the vehicle V is stopped and may perform a mode switching process by the mode switching device 2 only when the vehicle V is stopped. Further, the mode switching device may detect whether or not the vehicle V is in an automatic driving state and perform the mode switching process in the automatic driving state.

When the door D is locked, the current positions of the MID seats S3 and S4 and the 3rd seats S5 and S6 mounted on the vehicle V are detected. The current position is calculated by, for example, the signal of the motor received from the seat adjustment device 4. When a sensor capable of detecting a position such as a LiDER sensor is mounted, the current positions of the MID seats S3 and S4 and the 3rd seats S5 and S6 may be specified by the sensor or the like (steps S103 and S104).

The mode switching device 2 detects the current positions of the MID seats S3 and S4 and the 3rd seats S5 and S6 and detects the current position of the shade SH (step S104). The current position is calculated by the signal of the motor received from the shade adjustment device 5.

The seat movement amount calculation unit 112 calculates the movement amount of the MID seats S3 and S4 and the 3rd seats S5 and S6 from the current position and the position information of the selected mode information (steps S106 and S107).

The movement amount is determined (steps S109 and S110) and when the calculated movement amount is 0, the MID seats S3 and S4 and the 3rd seats S5 and S6 do not move (No in steps S109 and S110).

When the movement amount of the MID seats S3 and S4 and the 3rd seats S5 and S6 is not 0 (Yes in steps S109 and S110), a signal including the movement amount is transmitted to the seat adjustment device 4 and the seat adjustment device 4 moves the MID seats S3 and S4 and the 3rd seats S5 and S6 on the basis of the movement amount (steps S112 and S113).

The seat adjustment device 4 determines whether or not the movement of the MID seats S3 and S4 and the 3rd seats S5 and S6 is completed and when the movement of each seat is completed (Yes insteps S115 and S116), the movement completion notification is transmitted to the mode switching device 2 (step S118). When the movement of the seat is not completed (No in steps S115 and S116), the process returns to steps S112 and S113 to continue the movement of the seat S.

The movement amount of the shade SH is calculated at the same time as the movement of the seat S (step S108). At this time, when the calculated movement amount is 0, the shade SH does not move (No in step S118). When the movement amount of the shade SH is not 0 (Yes in step S111), a signal including the movement amount is transmitted to the shade adjustment device 5 to move the shade SH and the shade adjustment device 5 moves the shade SH on the basis of the movement amount (step S114). The shade adjustment device 5 determines whether or not the movement of the shade SH is completed (step S117) and when the movement of the shade SH is completed (Yes in step S117), the movement completion notification is transmitted to the mode switching device 2 to end the mode switching process.

When the movement of the shade SH is not completed (No in step S117), the process returns to step S114 to continue the movement of the shade SH.

By such a procedure, the mode switching device 2 changes the positions of the seat S and the shade SH. Additionally, the flow shown in FIG. 5 shows a case of moving the MID seats S3 and S4 and the 3rd seats S5 and S6, but the driver seat S1 and the assistant seat S2 may be moved.

Figure 5:
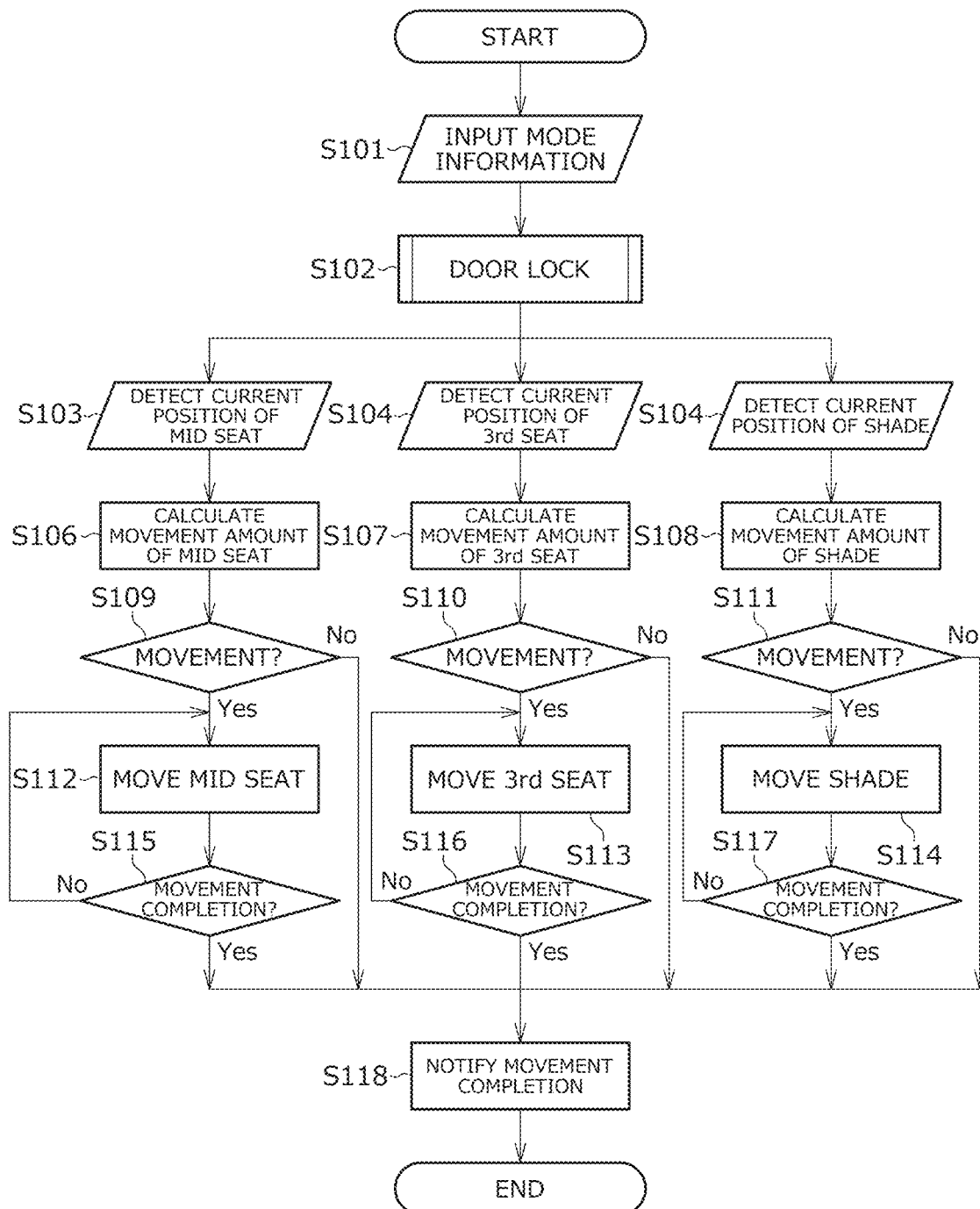
FIG. 5 is a flowchart showing a mode switching process of changing the arrangement of a seat and a shade.
Figure 6:
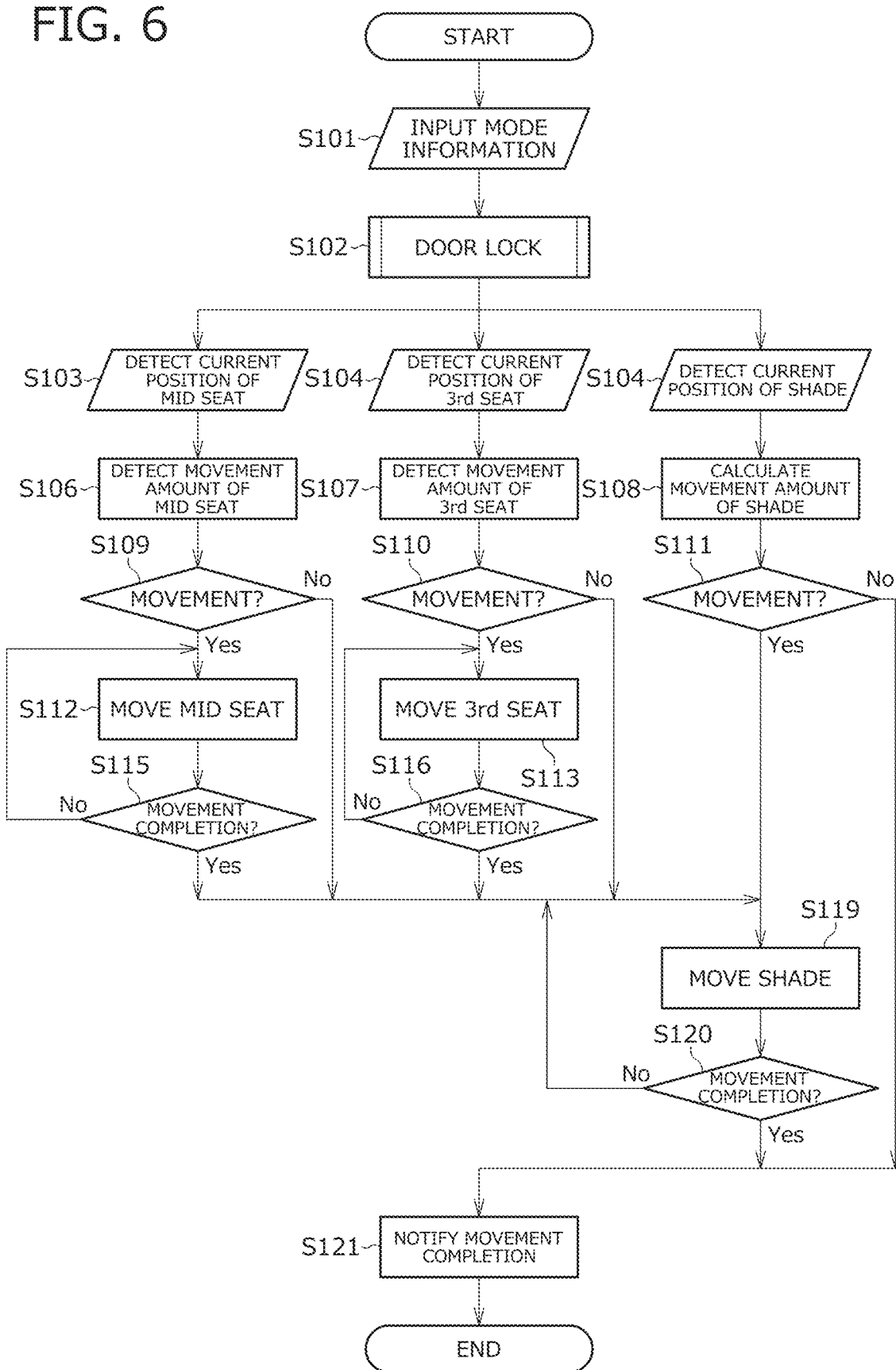
FIG. 6 is a flowchart showing another example of the mode switching process of changing the arrangement of the seat and the shade.

In a mode adjustment process shown in FIG. 5, the movement of the seat S and the movement of the shade SH are performed at the same time. The seat S and the shade SH may not be moved at the same time. FIG. 6 shows another example of the mode adjustment process. As shown in FIG.

6, the positions and the movement amount of the seat S and the shade SH are calculated at the same time, but in the actual movement, the movement of the shade SH (step S119) and the movement completion determination (step S120) may be performed after the movement of the MID seats S3 and S4 and the 3rd seats S5 and S6 ends.

Figure 7:
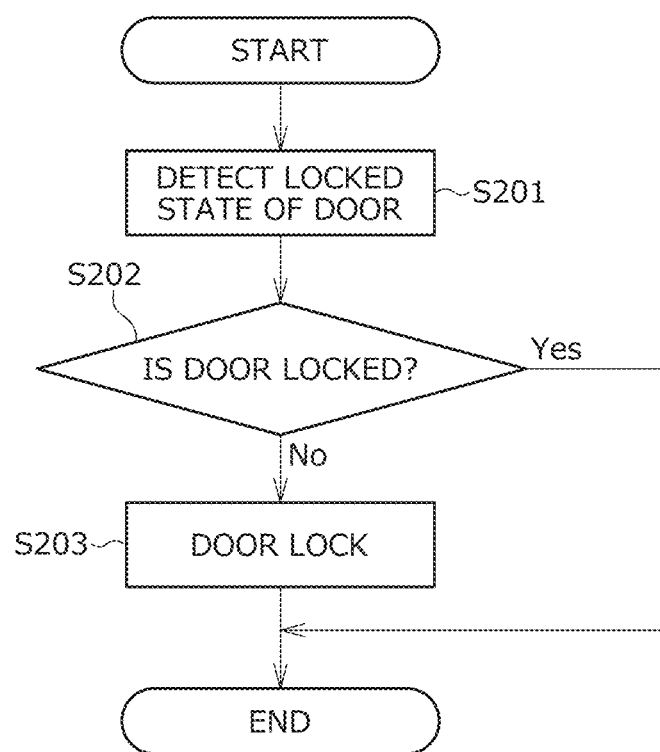
FIG. 7 is a flowchart showing a door lock confirmation process.

FIG. 7 shows the flow of the door lock confirmation process. The mode switching device 2 receives a signal from the door lock device 6 and detects the locked state of the door D (step S201). When the door D is locked (Yes in step S202), the confirmation process ends and the mode switching process is continuously performed. When the door D is not locked (No in step S202), a door lock signal of locking the door D is transmitted to the door lock device 6 (step S203). The door lock device 6 locks the door D. Then, the confirmation process ends and the mode switching process shown in FIGS. 5 and 6 is continuously performed.

Figure 8:
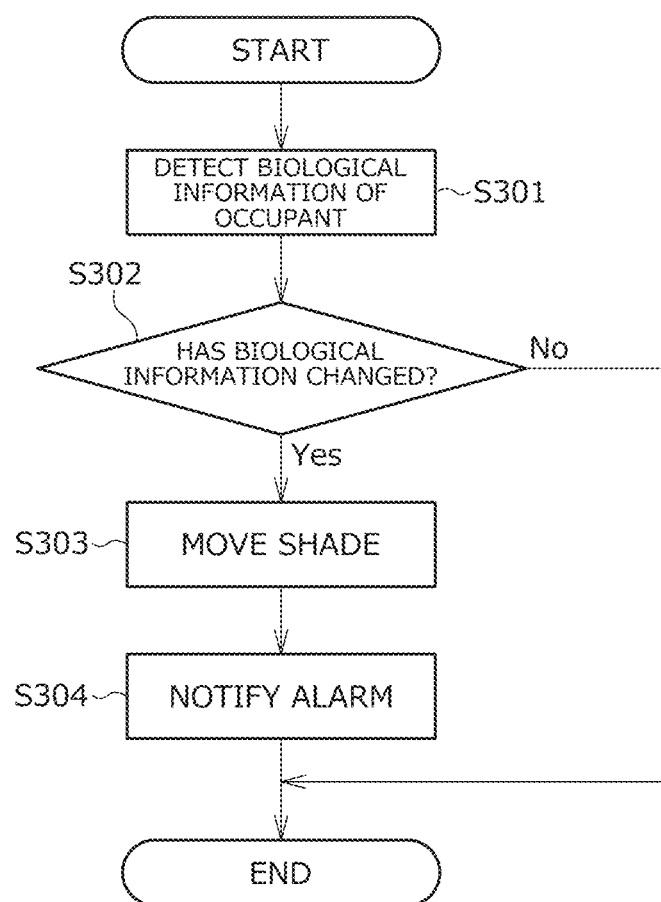
FIG. 8 is a flowchart showing a biological information notification process of notifying a change in biological information.

Next, a biological information detection process will be described with reference to FIG. 8. The mode switching device 2 may detect the biological information of the occupant sitting on the seat S by using the biological information detection device 9 during the seat switching process. First, the mode switching device 2 detects the timing of breathing of the occupant and the like by using the pressure sensor and the like mounted on the seat S (step S301). The detected biological information may be the body temperature or the like using the temperature sensor. Next, the detected biological information of the occupant is compared with, for example, the normal biological information stored in the storage unit or the like (step S302). When a change is smaller than a predetermined threshold value, it is determined that there is no change (No in step S302) and the biological information detection process ends. When the change is larger than the predetermined threshold value, it is determined that there is a large change in the biological information (Yes in step S302) and the change is notified to the occupant. As a notification method, the mode switching device 2 first moves the shade SH so that the window W is hidden (step S303). Next, an alarm signal is transmitted to the speaker SP which is the notification device 10. The speaker SP notifies an alarm (step S304). By detecting a change in biological information and notifying the occupant at the timing of switching the mode of the seat S, it is possible to promptly notify the occupant that the biological information has changed.

Figure 9:
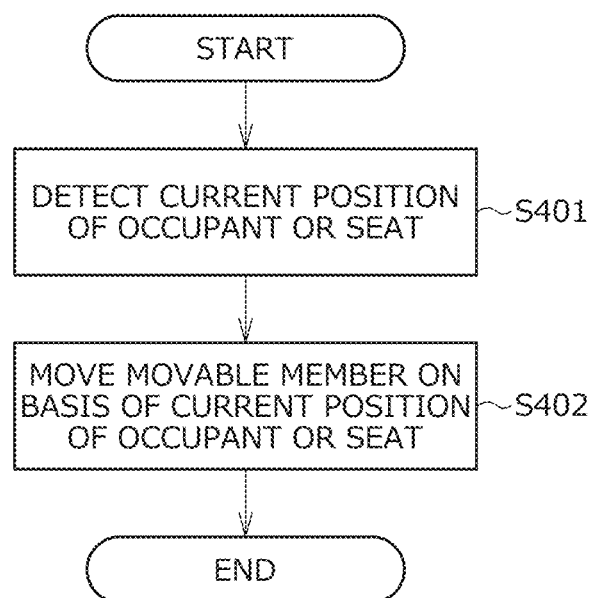
FIG. 9 is a flowchart showing a process of moving a movable member on the basis of a current position of an occupant or a seat.

Next, a position adjustment process of the movable member 40 (the speaker SP, the lamp LI, or the like) will be described with reference to FIG. 9. The mode switching device 2 adjusts the position of the movable member after performing the mode switching process. First, the mode switching device 2 detects the current position of the occupant or the seat S (step S401). The position of the occupant is determined, for example, on the basis of that the occupant position detection unit 120 detects the sitting position of the seat S. The position of the occupant may be detected by the LiDER sensor or the like. The current position of the seat S is acquired by the seat position detection unit 111.

A movable member position detection unit 118 detects the current position of the movable member 40 and a movable member movement amount calculation unit 119 calculates the movement amount to an appropriate position included in the mode information on the basis of the current position of the occupant or the seat. The mode switching device 2 moves the movable member 40 by the movable member adjustment device 8 (step S402). For example, a process such as moving the movable member 40 to the vicinity of the occupant or the seat is performed. The distance between the occupant or the seat and the movable member differs depending on the selected mode, and the information on the distance is registered in the mode information.

<Seat Adjustment Process>

Figure 10:
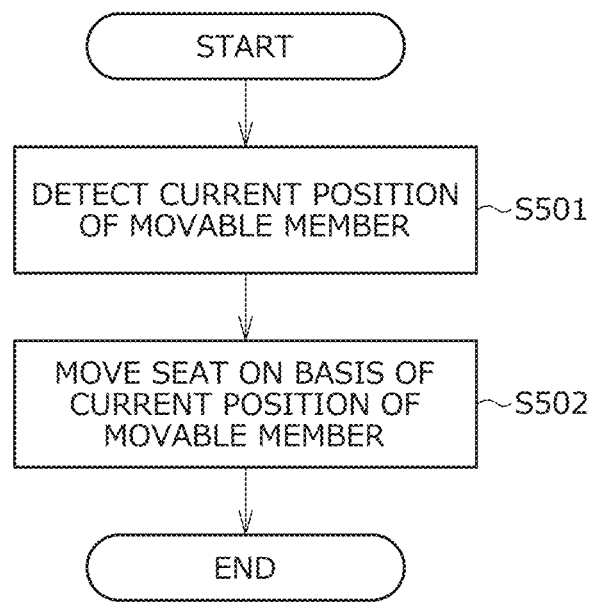
FIG. 10 is a flowchart showing a process of moving the seat on the basis of a current position of the movable member.

After the mode switching process is performed, a seat adjustment process of adjusting the position of the seat S may be performed on the basis of the position of the movable member 40. FIG. 10 is a flowchart of the seat adjustment process. First, the current position of the movable member 40 is detected by the movable member position detection unit 118 (step S501). At this time, the current position of the seat S is also detected. The seat movement amount calculation unit 112 calculates the movement amount of the seat S on the basis of the current position of the movable member 40 and the seat adjustment device 4 moves the seat S (step S502). When the position of the movable member 40 cannot be moved, the positional relationship between the seat S and the movable member 40 can be made appropriate by adjusting the position of the seat S.

<Window Adjustment Process>

Figure 11:
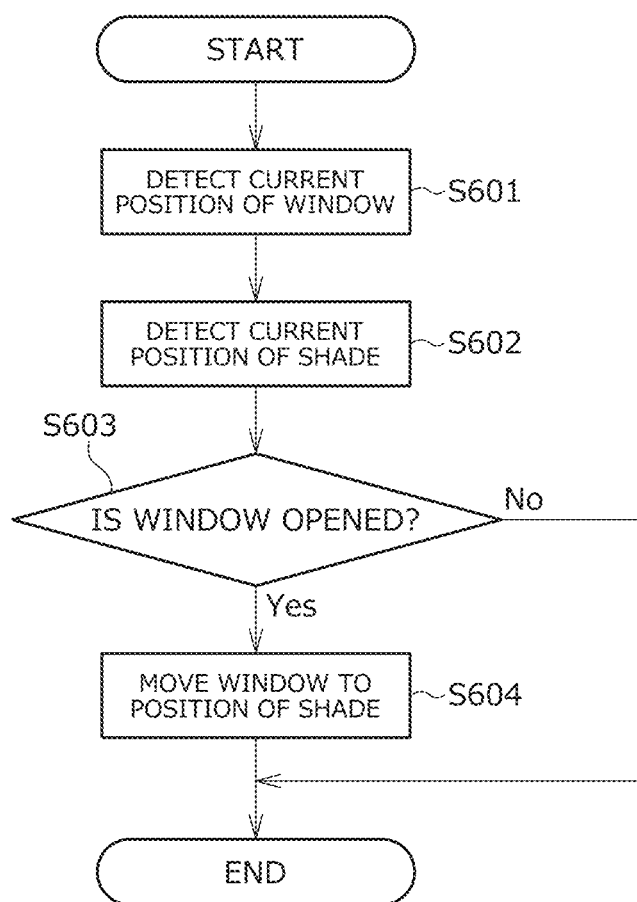
FIG. 11 is a flowchart showing a process of moving a window on the basis of a current position of the shade.

Further, a window adjustment process of adjusting the position of the window W on the basis of the position of the shade SH may be performed after the mode switching process is performed. FIG. 11 is a flowchart of the window adjustment process. First, the current position of the window W is detected by the window position detection unit 116 (step S601) and then the current position of the shade SH is detected by the shade position detection unit 113 (step S602). It is determined whether or not the window W is open (step S603). When the window W is not open, that is, the window W is closed (No in step S603), the window adjustment process ends. When the window is open (Yes in step S603), the shade SH may flutter. Therefore, the movement amount is calculated by the window movement amount calculation unit 117 and the window W is moved to the position of the shade SH (step S604). Even when the position of the shade SH is set in accordance with the mode, since the fluttering of the shade SH is suppressed by moving the window W to the position of the shade SH, the shade SH can be protected.

Figure 12A:
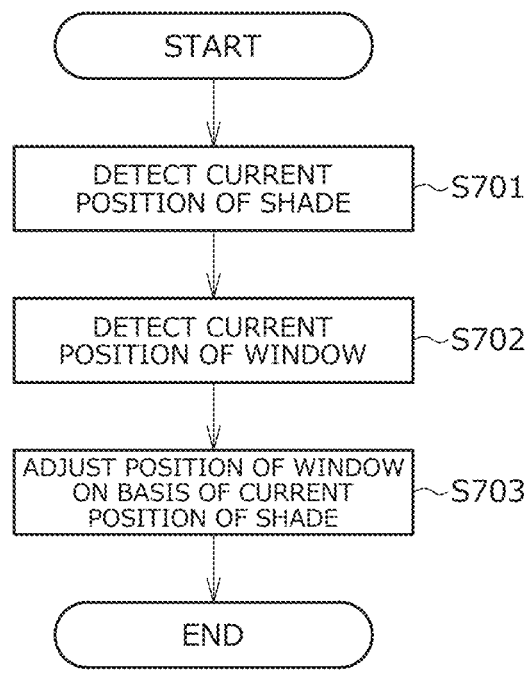
FIG. 12A is a flowchart showing a process of moving the window on the basis of a current position of the shade.

Further, the position of the window W may be adjusted on the basis of the current position of the shade SH regardless of whether or not the window W is closed after the mode switching process is performed as in the window adjustment process shown in FIG. 12A. In the window adjustment process shown in FIG. 12A, the current position of the shade SH is detected by the shade position detection unit 113 (step S701) and the current position of the window W is detected by the window position detection unit 116 (step S702). The window movement amount calculation unit 117 calculates the movement amount of the window W. The position of the window W is adjusted on the basis of the current position of the shade SH (step S703). For example, the upper end of the window W is adjusted to match the height of the upper end of the shade SH. Since the shade SH is not directly exposed to the wind because the windows are at the same height, the fluttering of the shade SH is suppressed.

<Shade Adjustment Process>

Figure 12B:
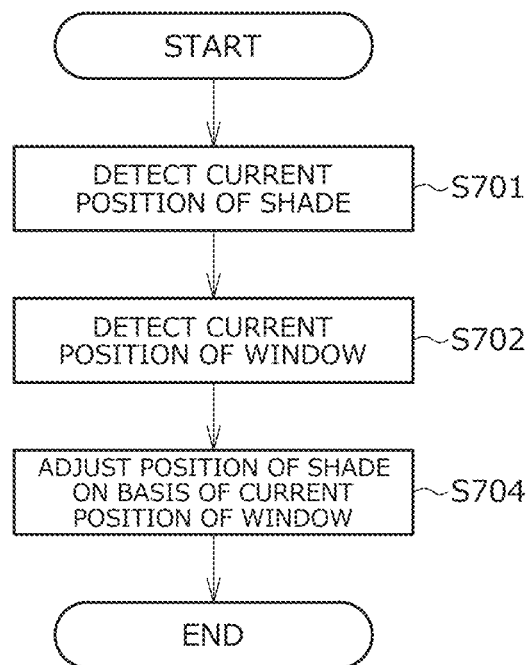
FIG. 12B is a flowchart showing a process of moving the shade on the basis of a current position of the window.

Additionally, the position of the shade SH may be adjusted on the basis of the current position of the window W regardless of whether or not the window W is closed after the mode switching process is performed as in the shade adjustment process shown in FIG. 12B. In the shade adjustment process shown in FIG. 12B, the current position of the shade SH is detected by the shade position detection unit 113 (step S701) and the current position of the window W is detected (step S702). The position of the shade is adjusted on the basis of the current position of the window W (step S704). For example, the upper end of the shade SH is adjusted to the height of the upper end of the window W.

An example of the mode information registered in the storage unit 130 will be described with reference to FIGS. 13A to 13F.

Additionally, the MID seats S3 and S4 and the 3rd seats S5 and S6 are foldable, and the cushion and seat back are reversed so that they can be seated backwards. The floor FL is provided with recesses capable of accommodating the MID seats S3 and S4 and the 3rd seats S5 and S6. Further, the assistant seat S2 can also be in a tip-up state with the cushion flipped up.

Figure 13A:
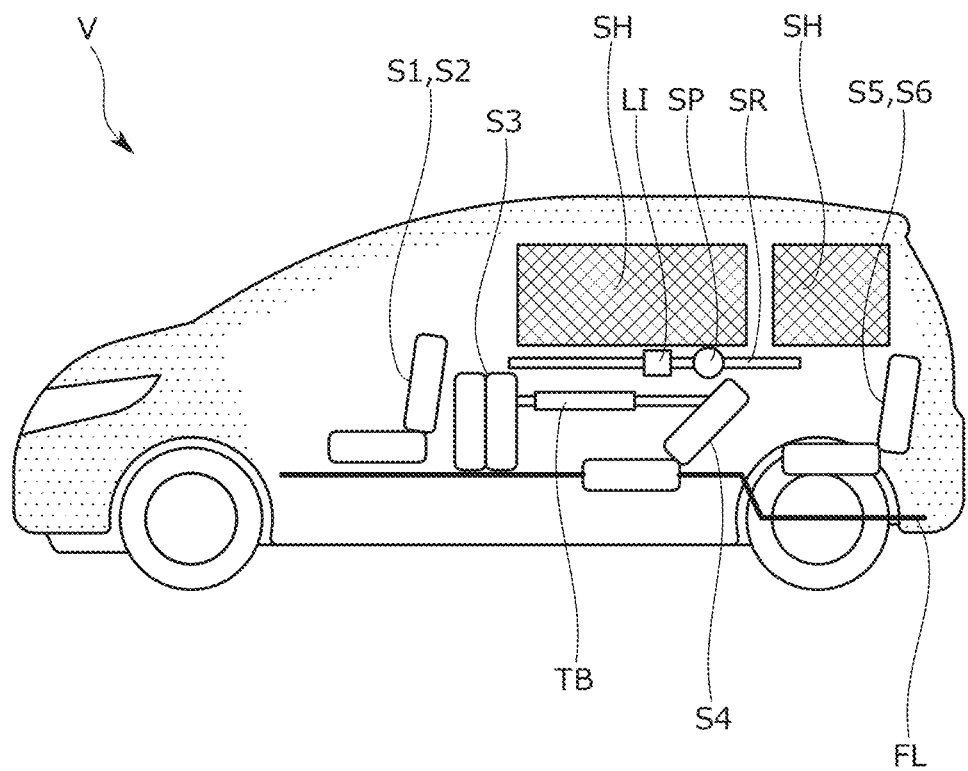
FIG. 13A is an explanatory diagram showing a relaxing and reading mode.

The mode shown in FIG. 13A is a relaxing and reading mode. One of the MID seats S3 and S4 is folded, the other of the MID seats S3 and S4 is reclined, and the cushion is accommodated in the recess provided in the floor. The 3rd seats S5 and S6 have moved to the rearmost position. The 3rd seats S5 and S6 may be accommodated in the floor FL. The shade SH moves to the upper end of the window W so that the window is blindfolded. The table TB, the lamp LI, and the speaker SP corresponding to the movable member 40 are arranged in accordance with the positions of the MID seats S3 and S4. The movable member 40 is attached to be movable by the slide rail SR, but may be attached to the door D (door trim DT) by the engagement using an unevenness structure or a magnet.

Figure 13B:
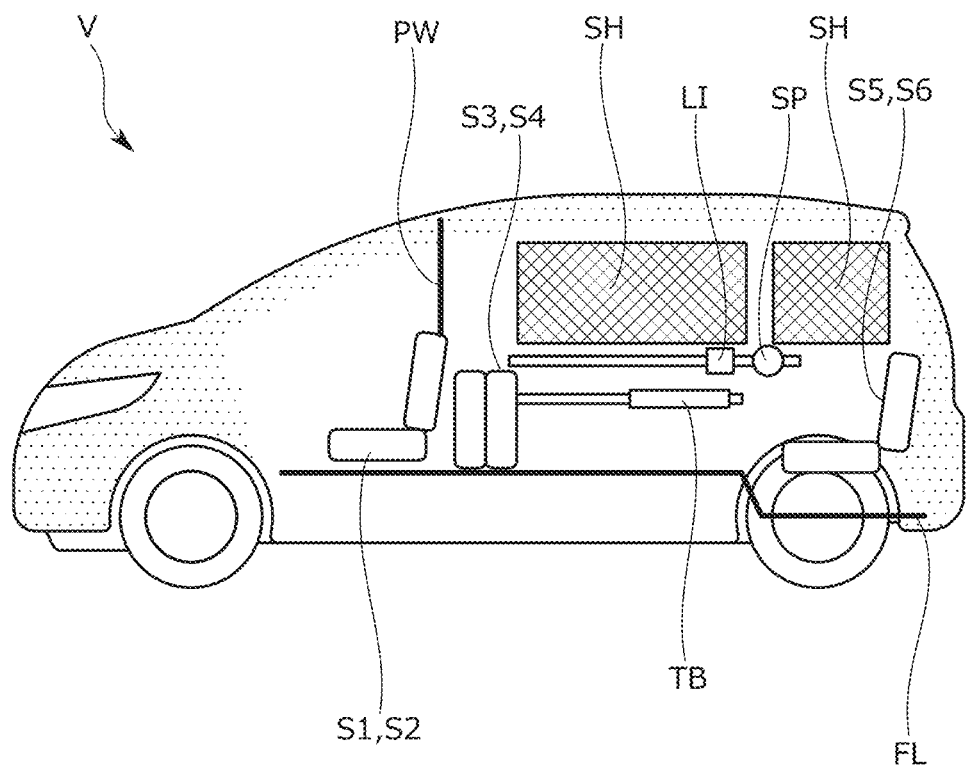
FIG. 13B is an explanatory diagram showing a TV mode.

The mode shown in FIG. 13B is a TV mode seeing a TV. The MID seats S3 and S4 are folded and moved forward. The 3rd seats S5 and S6 are accommodated in the floor FL, but can be moved up and down in an accommodated state. The shade SH is located at a position to hide the window W. The lamp LI and the speaker SP are moved in accordance with the positions of the 3rd seats S5 and S6. There is a monitor on the back of the folded MID seats S3 and S4, and the occupants seated on the 3rd seats S5 and S6 can see the image displayed on the monitor. A partition member is provided between the front seats (the driver seat S1 and the assistant seat S2) and the MID seats S3 and S4 to enable shielding and sound insulation. The movable member 40 such as the table TB, the lamp LI, and the speaker SP is movably attached by the slide rail SR.

Figure 13C:
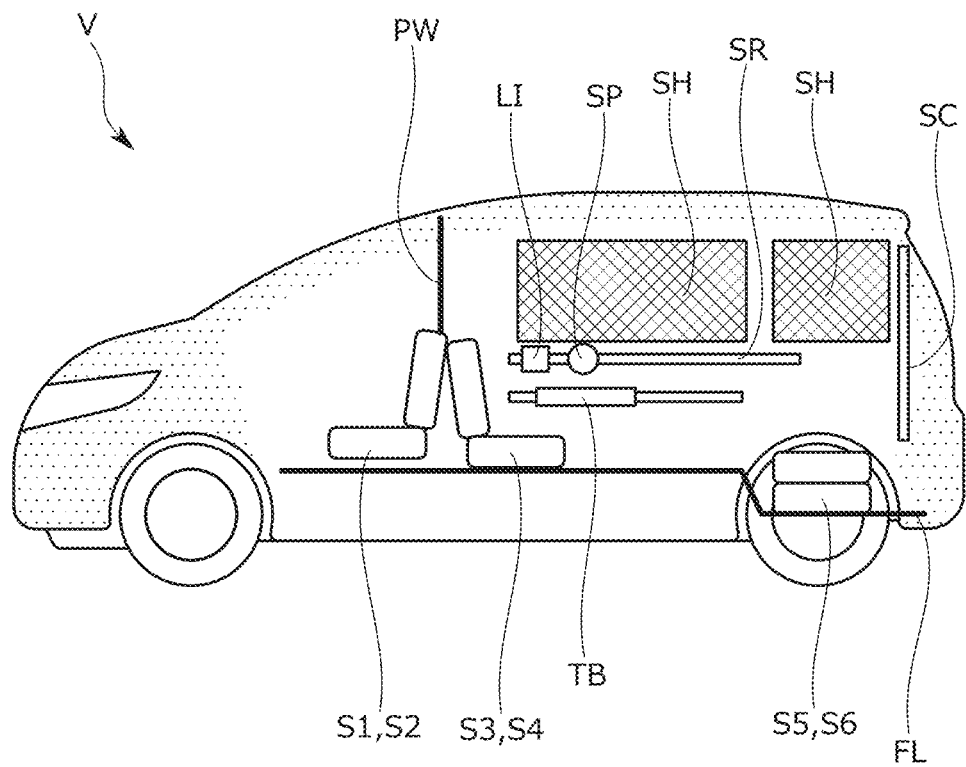
FIG. 13C is an explanatory diagram showing a theater mode.

The mode shown in FIG. 13C is a theater mode in which an image can be projected on a screen SC provided on the rear gate RG (back door) to watch a movie. The 3rd seats S5 and S6 are folded and accommodated in a recess under the floor, and the MID seats S3 and S4 are installed to face backward. The shade SH moves to a position to hide the window W so that the window is blindfolded. The screen SC is attached to the inside of the rear gate RG. A partition member is provided between the front seats (the driver seat and the assistant seat) and the MID seat to enable shielding and sound insulation. The movable member 40 such as the table TB, the lamp LI, and the speaker SP is movably attached by the slide rail SR.

Figure 13D:
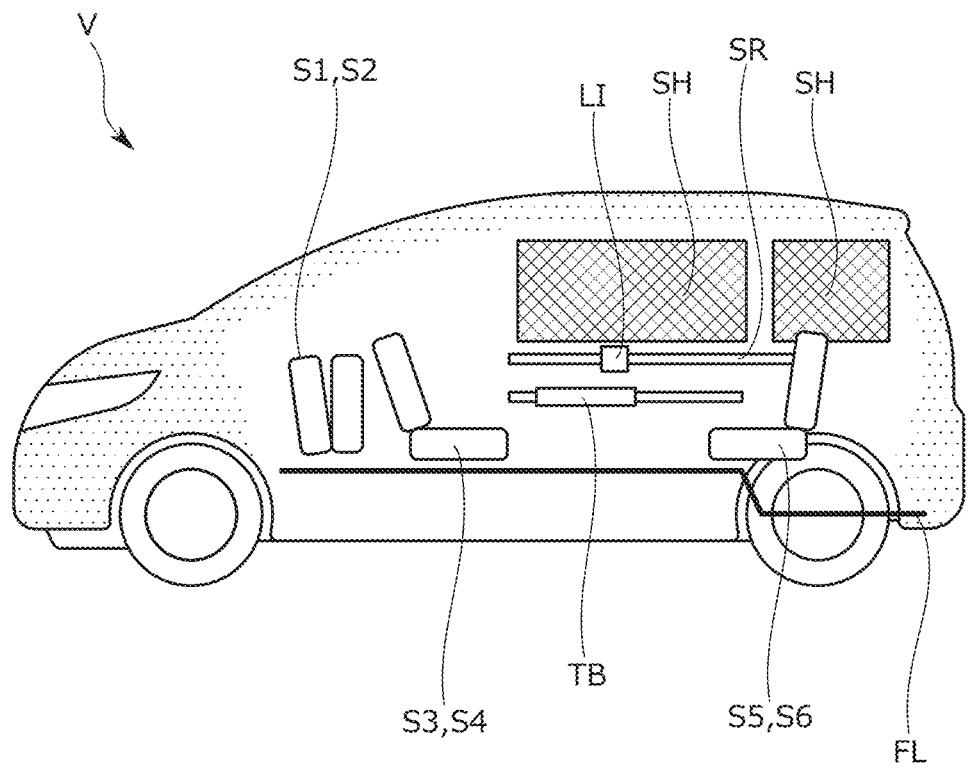
FIG. 13D is an explanatory diagram showing a talk mode.

The mode shown in FIG. 13D is a talk mode in which the occupants enjoy a conversation. The front seats (the driver seat S1 and the assistant seat S2) are in a tip-up state with the cushion flipped up. The MID seats S3 and S4 are installed to face backward. The shade SH moves to a position to hide the window W so that the window is blindfolded. The table TB and the lamp LI are arranged between the MID seats S3 and S4 and the 3rd seats S5 and S6 and the occupants sitting on the respective seats S can talk to each other.

Figure 13E:
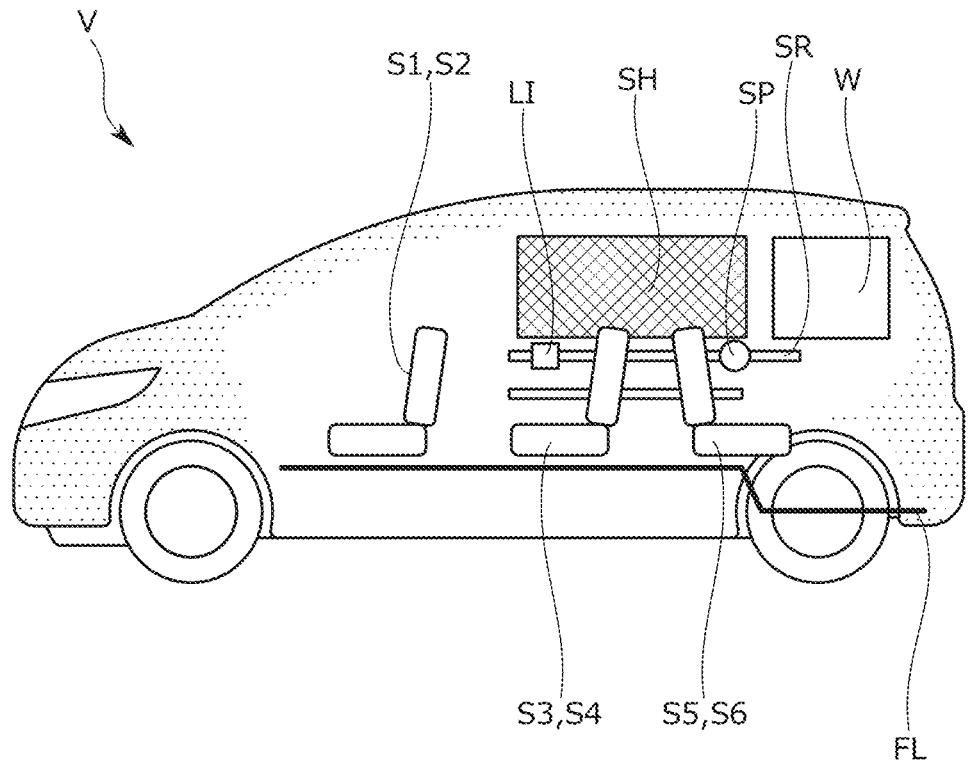
FIG. 13E is an explanatory diagram showing a mode of seeing a scenery.

The mode shown in FIG. 13E is a mode in which the occupant sees the scenery. The 3rd seats S5 and S6 are installed to face the back side so that the outside scenery can be seen from the window W. The shade SH is lowered and the outside scenery can be seen through the window W.

Figure 13F:
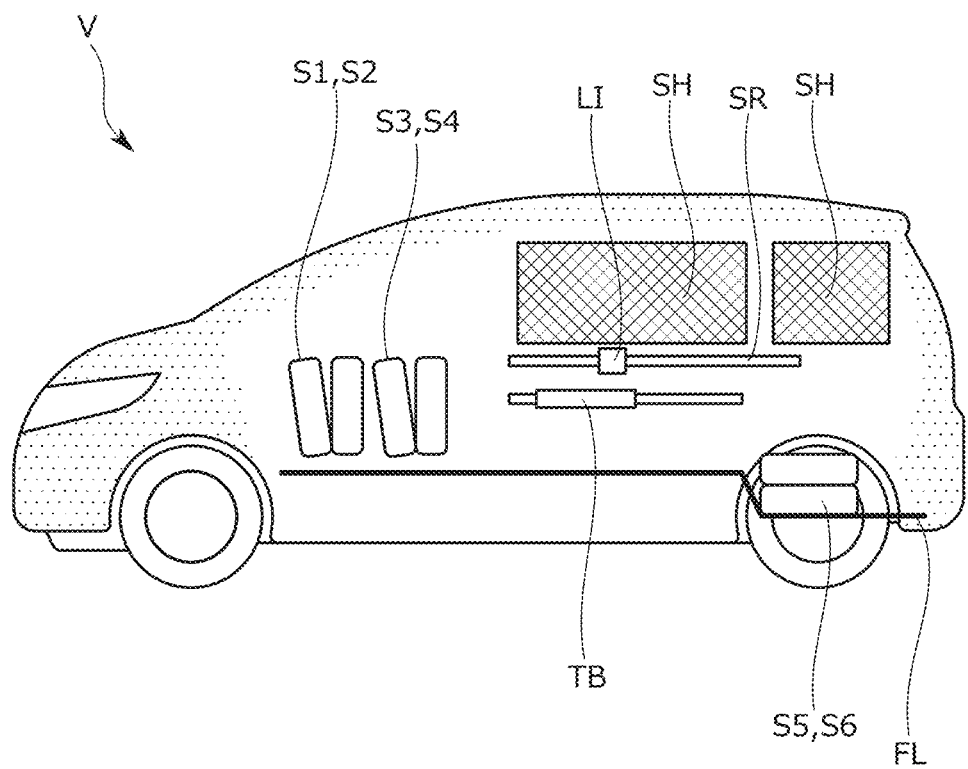
FIG. 13F is an explanatory diagram showing a child room mode.

The mode shown in FIG. 13F is a child room mode in which children can play. In a state in which the vehicle is parked in the parking lot of the house, the vehicle interior is used as a space for children to play. The front seats (the driver seat and the assistant seat) and the MID seats S3 and S4 are in a tip-up state with the cushion flipped up and moved forward. The 3rd seat is accommodated in the recess of the floor. The shade SH moves to a position to hide the window W so that the window is blindfolded. As shown in FIG. 3B, a floor mat FM may be provided on a floor surface. The table TB and the lamp LI are arranged by the slide rail SR. The communication function provided in the ECU 100 allows the connection to parents at home. For example, a camera that captures the vehicle interior can be installed, and the image can be transmitted to parents at home.

Additionally, the driver seat S1, the assistant seat S2, the MID seats S3 and S4, and the 3rd seats S5 and S6 are mounted on the vehicle V, but these can be removed. For example, a five-seater mode can be set by removing the assistant seat S2.

The mode adjustment system 1 and the mode adjustment method according to the embodiment of the present invention have been described above with reference to the drawings. The mode adjustment system 1 is provided in a conveyance vehicle such as a minivan, but the present invention is not limited to that used in a vehicle mounted on a ground traveling conveyance having wheels such as an automobile or a railroad. The mode adjustment system can be mounted on an aircraft or a ship that moves outside the ground.

REFERENCE SIGNS LIST

1: mode adjustment system
2: mode switching device
3: input device
4: seat adjustment device
5: shade adjustment device
6: door lock device
7: window adjustment device
8: movable member adjustment device
9: biological information detection device
10: notification device
40: movable member
110: control unit
111: seat position detection unit
112: seat movement amount calculation unit
113: shade position detection unit
114: shade movement amount calculation unit
115: door lock detection unit
116: window position detection unit
117: window movement amount calculation unit
118: movable member position detection unit
119: movable member movement amount calculation unit
120: occupant position detection unit
130: storage unit
140: transmission unit
150: input unit
V: vehicle (conveyance)
S: seat
S1: driver seat
S2: assistant seat
S3, S4: MID seat
S5, S6: 3rd seat SH: shade
SP: speaker
LI: lamp
TB: table
M: monitor
D: door
DT: door trim
W: window
LR: long rail
SR: slide rail
FM: floor mat
WP: wallpaper
CH: hot/cold cup holder
FL: floor

The invention claimed is:

1. A mode adjustment system for adjusting positions of a seat and a shade provided in an interior of a conveyance, comprising:
    an input device that is configured so that an occupant selects one of a plurality of mode information in which position information of the seat and the shade are registered in advance;
    a mode switching device that receives the mode information selected by the occupant from the input device and switches the positions of the seat and the shade on the basis of the received mode information;
    a seat adjustment device that adjusts the position of the seat; and
    a shade adjustment device that adjusts the position of the shade,
    wherein the mode switching device includes:
        a storage that stores the plurality of mode information,
        an input that receives the mode information selected from the input device,
        a seat position detector that detects a current position of the seat,
        a seat movement amount calculator that calculates a movement amount of the seat from position information of the seat registered in the mode information and a current position of the seat detected by the seat position detector,
        a shade position detector that detects a current position of the shade,
        a shade movement amount calculator that calculates a movement amount of the shade from position information of the shade registered in the mode information and a current position detected by the shade position detector, and
        a transmitter that transmits the calculated movement amount of the seat to the seat adjustment device and transmits the calculated movement amount of the shade to the shade adjustment device,
    wherein the seat adjustment device adjusts the position of the seat on the basis of the received movement amount of the seat, and
    wherein the shade adjustment device adjusts the position of the shade on the basis of the received movement amount of the shade.

2. The mode adjustment system according to claim 1, further comprising:
    a door lock device that locks a door of the conveyance,
    wherein the mode switching device includes a door lock detector that detects a locked state of the door,
    wherein the mode switching device detects the locked state of the door by the door lock detector before the positions of the seat and the shade are adjusted, and wherein the mode switching device locks the door by the door lock device when the door is not locked.

3. The mode adjustment system according to claim 1, wherein the mode switching device switches the positions of the seat and the shade when the conveyance is in a stop state or an automatic driving state.

4. The mode adjustment system according to claim 1, further comprising:
    a biological information detection device that detects biological information of the occupant; and
    a notification device that notifies the occupant of an alarm,
    wherein when the biological information detection device detects a change in the biological information of the occupant, the mode switching device instructs the shade adjustment device to move the shade to a predetermined position and instructs the notification device to notify the alarm.

5. The mode adjustment system according to claim 1, further comprising:
    a movable member that is provided in a door of the conveyance to be movable on the door; and
    a movable member adjustment device that adjusts a position of the movable member,
    wherein the mode switching device includes an occupant position detector that detects a current position of the occupant and instructs the movable member adjustment device to adjust the position of the movable member on the basis of the current position of the occupant detected by the occupant position detector.

6. The mode adjustment system according to claim 1, further comprising:
    a movable member that is provided in a door of the conveyance to be movable on the door; and
    a movable member adjustment device that adjusts a position of the movable member,
    wherein the mode switching device instructs the movable member adjustment device to adjust the position of the movable member on the basis of a current position of the seat detected by the seat position detector.

7. The mode adjustment system according to claim 1, further comprising:
    a movable member that is provided in a door of the conveyance to be movable on the door,
    wherein the mode switching device includes a movable member position detector that detects a current position of the movable member and instructs the seat adjustment device to adjust the position of the seat on the basis of the current position of the movable member detected by the movable member position detector.

8. The mode adjustment system according to claim 7, wherein the movable member is provided to be movable on a door trim provided on an interior side of the door.

9. The mode adjustment system according to claim 1, wherein the mode switching device includes a window position detector that detects a current position of a window provided in the conveyance and switches the positions of the seat and the shade when a current position of the window detected by the window position detector is located at a closed position.

10. The mode adjustment system according to claim 1, further comprising:
    a window adjustment device that adjusts a position of a window provided in the conveyance,
    wherein the mode switching device includes a window position detector that detects a current position of the window and instructs the window adjustment device to move the window to the position of the shade when a current position of the window detected by the window position detector is located at an open position.

11. The mode adjustment system according to claim 1, wherein the mode switching device includes a window position detector that detects the current position of the window provided in the conveyance, and
wherein the mode switching device instructs the shade adjustment device to adjust the position of the shade on the basis of the current position of the window.

12. The mode adjustment system according to claim 1, further comprising:
a window adjustment device that adjusts a position of a window provided in the conveyance,
wherein the mode switching device instructs the window adjustment device to adjust the position of the window on the basis of the current position of the shade.

13. A mode adjustment method of adjusting positions of a seat and a shade by using an input device configured to select one of a plurality of mode information in which position information of the seat and the shade provided in an interior of a conveyance are registered, a mode switching device switching the positions of the seat and the shade on the basis of the mode information, a seat adjustment device adjusting the position of the seat, and a shade adjustment device adjusting the position of the shade, comprising:
causing the mode switching device to store the plurality of mode information;
causing the mode switching device to receive the mode information selected by the input device from the input device;
causing the mode switching device to detect a current position of the seat;
causing the mode switching device to detect a current position of the shade;
causing the mode switching device to calculate a movement amount of the seat from position information of the seat included in the mode information received from the input device and the detected current position of the seat;
causing the mode switching device to calculate a movement amount of the shade from position information of the shade included in the mode information received from the input device and the detected current position of the shade;
causing the mode switching device to transmit the calculated movement amount of the seat to the seat adjustment device;
causing the mode switching device to transmit the calculated movement amount of the shade to the shade adjustment device;
causing the seat adjustment device to adjust the position of the seat on the basis of the received movement amount of the seat; and
causing the shade adjustment device to adjust the position of the shade on the basis of the received movement amount of the shade.

* * * * *